United States Patent [19]

Gaussa, Jr. et al.

[11] Patent Number: 5,141,709

[45] Date of Patent: Aug. 25, 1992

[54] EXCORE POWER LEVEL DETECTOR ASSEMBLY FOR NEUTRON FLUX MONITORING SYSTEM

[75] Inventors: Louis W. Gaussa, Jr., Irwin; Panfilo A. Federico, McKees Rocks, both of Pa.

[73] Assignee: Westinghouse Electric Corp., Pittsburgh, Pa.

[21] Appl. No.: 800,878

[22] Filed: Nov. 27, 1991

Related U.S. Application Data

[63] Continuation-in-part of Ser. No. 591,200, Oct. 1, 1990, abandoned.

[51] Int. Cl.⁵ .......................................... G21C 17/108
[52] U.S. Cl. .................................... 376/254; 376/255; 376/154; 250/390.01; 250/390.1
[58] Field of Search ............... 376/254, 255, 153, 154, 376/155; 250/390.01, 390.1

[56] References Cited

U.S. PATENT DOCUMENTS

| | | | |
|---|---|---|---|
| 2,928,965 | 3/1960 | Bayard et al. | 313/61 |
| 3,067,329 | 12/1962 | Linden | 250/83.1 |
| 3,809,940 | 5/1974 | Sekella | 313/61 R |
| 3,956,654 | 5/1976 | Gleason | 313/61 D |
| 4,504,437 | 3/1985 | Underwood et al. | 376/153 |
| 4,556,793 | 12/1985 | Allen et al. | 250/267 |

Primary Examiner—Brooks H. Hunt
Assistant Examiner—Chrisman D. Carroll
Attorney, Agent, or Firm—M. G. Panian

[57] ABSTRACT

An excore neutron flux power level detector assembly includes a neutron flux detector subassembly and a moderator subassembly having the form of a dual-wall canister of annular cross-section for receiving the detector subassembly in coaxial and telescoping relationship therein and having moderator material, preferably high density polyethylene, in the annular space between the dual-walls thereof for converting epithermal neutrons in leakage flux from a nuclear reactor to thermal neutrons having a power level detectable by the flux detector subassembly. Insulating spacer elements affixed concentrically about and axially displaced along the surface of the cylindrical housing of the detector provide lateral, structural support and spacing therebetween and electrical insulation of the detector subassembly from the moderator subassembly.

16 Claims, 4 Drawing Sheets

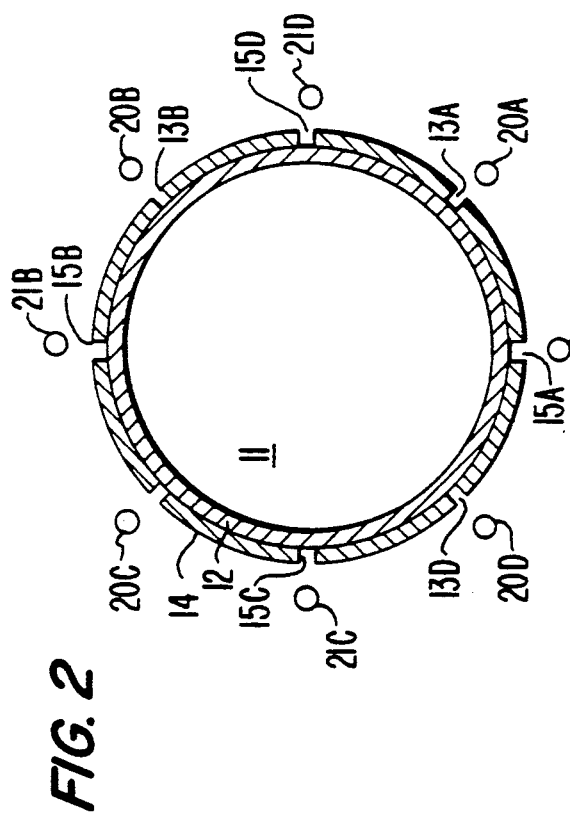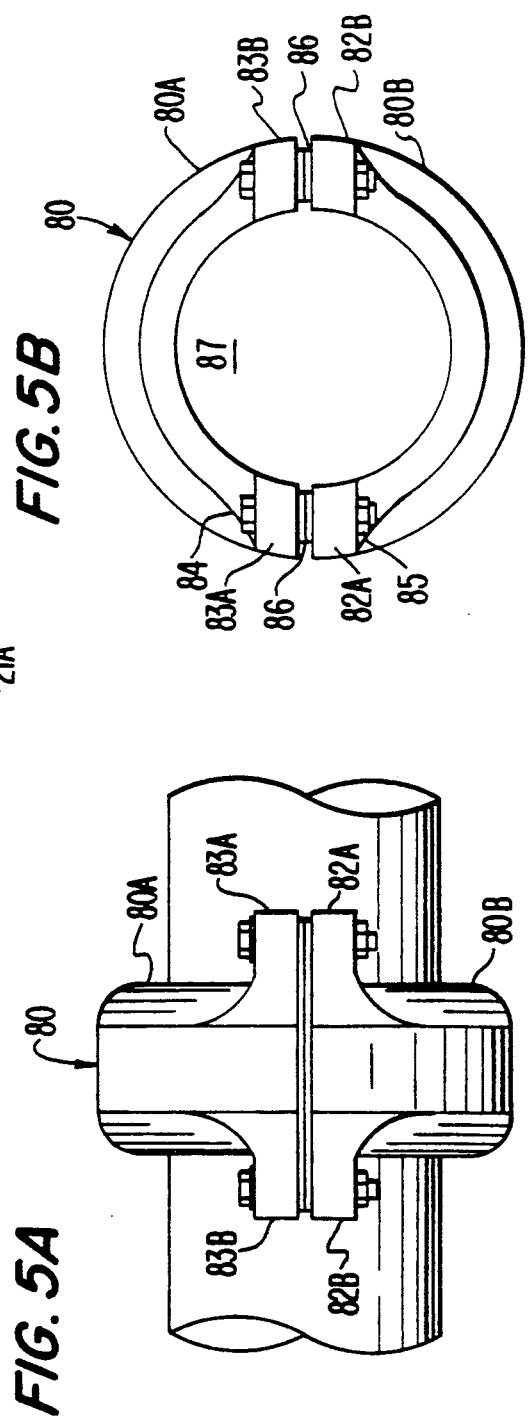

EXCORE POWER LEVEL DETECTOR ASSEMBLY FOR NEUTRON FLUX MONITORING SYSTEM

CROSS-REFERENCE TO RELATED APPLICATION

This application is a continuation-in-part of application Ser. No. 07/591,200 filed Oct. 1, 1990 in the names of Louis W. Gaussa, Jr. and Panfilo A. Federico and assigned to the common assignee herewith, Westinghouse Electric Corporation, now abandoned.

BACKGROUND OF THE INVENTION

1. Field of the Invention

This invention relates to excore detectors for neutron flux monitoring systems and more particularly, to an improved excore detector assembly comprising a moderator subassembly for capturing epithermal neutrons and converting same to thermal neutrons which can be sensed by the detector subassembly thereby to afford increased detection sensitivity, while maintaining and satisfying both structural and electrical connection and shielding requirements, space compatibility constraints, and seismic qualifications.

2. State of the Prior Art

Excore detectors for use in neutron flux monitoring systems associated with nuclear reactors are well known. Excore detectors are positioned closely adjacent to the exterior of the reactor vessel and are intended to respond to and detect the level of neutron flux leakage from the reactor core, which is not absorbed by surrounding structures and materials. By thus monitoring the neutron fluency or neutron flux level, the excore detector provides an indication of the current power level of the reactor. Such detectors, and their associated instrumentation systems, are well-known and are of differing types. Excore power level detectors serve to monitor the power level of the reactor continuously during normal operating conditions and thus during generation of electrical power, while other types function to provide an indication of the reactor status during start-up and shutdown conditions. During all of these conditions, appropriate alarm and reactor trip functions are to be generated by the instrumentation system upon the detection of abnormal neutron fluency levels relative to the normal power level status of the reactor in its corresponding different stages of operation.

In more recent years, reactor designs have been changed to implement various improvements in structure and operation of nuclear power facilities with a primary goal of plant life extension (PLEX). Further improvements include the development of low leakage fuel, which contributes to overall improved fuel management. These improvements have lead to a reduction in the nuclear fluency from a reactor vessel. Design modifications as well have occurred with respect to the mechanical structure of the core to afford improved structural integrity and seismic qualification, and to accommodate and/or compensate for various thermal conditions. These modifications and changes, while having salutary, beneficial results as to safety and efficiency of operation of the reactor vessel, have adversely impacted the performance of excore neutron flux monitoring systems, rendering the same less effective for providing an accurate indication of the power level within the reactor.

To compensate for this reduced level of sensitivity of the excore detectors and the resultant decreased effectiveness of the excore neutron flux monitoring systems, improvements have been implemented for increasing the response sensitivity of the associated monitoring system electronics, particularly for lower flux levels. Even at present, however, the improved monitoring system electronics cannot provide the requisite sensitivity for accurately monitoring and thereby properly and safely indicating the reactor core power levels. Moreover, continued progress in reactor core and fuel design technology, both as incorporated into existing nuclear power plants and as will be implemented in the design of future plants, will result in further reduction or attenuation of the excore neutron fluency levels, which will further compound the present problem of inadequate monitoring sensitivity of excore detecting systems.

Many approaches have been considered to compensate for the reduction in the excore neutron fluency levels and effectively to increase excore detector sensitivity. Essentially all have encountered obstacles which either preclude practical implementation and/or are unsuccessful in achieving the required and intended, increased sensitivity of excore detectors. Repositioning, or realigning of existing excore detectors into greater proximity with the reactor vessel in many instances is not even possible, and, even where possible, typically will result in altering the correlation between the sensed fluency level and the actual level of operation within the reactor vessel. Correction, if possible, requires complex recalibration and testing to assure correct correlation of the detected and the resultant, indicated conditions, relative to actual. Modifications of the excore detector design and/or in the environment, including structural aspects, between the core baffle and the excore detectors, pursued in an effort to increase detector sensitivity, as well introduce the predictable result of altering the neutron fluency levels to which the excore detectors are exposed, with a resultant and correspondingly adverse effect on the accuracy of the indications produced by the neutron flux monitoring system.

A very pronounced material constraint on structural modification of the excore detectors is that for existing reactor vessel installations, the vertical thimbles, or wells, in which the excore neutron detectors are located cannot be modified since they are integral with the plant structure and are inaccessible. Thus in any practical sense, any excore detector structural modifications contemplated for improving sensitivity must still permit the location of the excore detector within the existing detector thimbles, or wells.

Aside from the constraints on structural modifications of the excore detectors so as to maintain compatibility with existing thimbles, or wells, a further critical factor is that any such modified detector structure must still satisfy, and thus not violate, the seismic qualification standards established by the U.S. Nuclear Regulatory Commission. From a practical standpoint, substantial time and expense would be entailed in achieving requalification of a modified detector structure; more importantly, seismic qualification of an excore detector is an essential safety factor, since the detector functions as an integral component of the reactor core-neutron flux monitoring system. Thus, continued viability of excore detectors during a seismic occurrence is essential to maintaining safe levels of operation of the reactor and/or to generating, reliably, an alarm indication when those levels are exceeded.

There are yet further, practical constraints on possible modifications of the excore detectors. beyond the above-noted structural compatibility and seismic qualification requirements. For example, the requisite electrical shielding of the detectors must be maintained, to assure that accurate electronic sensing signals are produced with minimum susceptibility to noise and other sources of electrical interference and to avoid the creation of electrical ground loops. Typically, the excore detector housing (also termed the "outer shield" of the detector) is connected to the electrical ground of the electrical instrumentation system through an associated conductor of a triaxial cable (other leads of which respectively supply high voltage to the detector from the NIS and supply the detector output signal(s) to the NIS). The principle point is that the detector must be isolated from the thimble, or well, within which it is installed and all high voltage, signal and reference (e.g., ground) levels which are supplied to or from the detector must be related solely to the NIS, thereby to minimize noise susceptibility and the creation of ground loops. Numerous other requirements are also imposed, such as the ability of the detector assembly to be readily removed and replaced within the thimble, or well; thus any structurally modified detector still must accommodate the existing lifting and/or other support attachments and mechanisms. Further, allowance must be made for water drainage from the detector assembly, to correct for the typical occurrence of fluid leakage impinging onto and thereby collecting within the thimble assembly, or well, within which the detector is housed. A further practical design consideration is that any modified excore detector structure preferably should maintain the compatibility, or interchangeability, of same for both top-mounted and bottom-mounted installations in corresponding, different reactor vessels.

SUMMARY OF THE INVENTION

The foregoing and other problems have resulted in a critical need for improved excore detectors having increased sensitivity. The improved excore detectors of the invention satisfy this critical need for increased sensitivity, while satisfying as well the numerous other above-discussed, acceptance criteria (e.g., structural, seismic, and electronic).

More particularly, the present invention provides a moderator subassembly comprising a dual wall canister of generally cylindrical configuration which contains and supports, within the annular spacing between the dual walls of the canister, moderator material which functions to convert epithermal neutrons contained in the neutron flux leakage and impinging thereon to thermal neutrons which are emitted therefrom and impinge on and thereby are detected by a neutron flux detector subassembly received coaxially within the moderator subassembly. Further, means are provided for concentrically positioning and laterally supporting the detector subassembly within, and laterally spaced and electrically insulated from, the moderator subassembly thereby to maintain the specified level of electrical isolation of the moderator subassembly. Various embodiments of the concentric positioning and lateral supporting means are disclosed, each of which embodiments is adapted for being fitted about the moderator subassembly and clamped thereon; two such positioning and supporting means are employed, positioned at axially displaced locations along the length of the detecting subassembly, each thereof extending laterally outwardly from the detector subassembly to positions engaging the interior maintain walls of the moderator subassembly thereby to maintain the concentric positioning and lateral supporting of the detector subassembly within the moderator subassembly while affording fluid flow therebetween. Anodizing any exposed aluminum surfaces, in addition to the known benefit of protection from caustic fluids, affords improved electrical isolation and longer life.

BRIEF DESCRIPTION OF THE DRAWINGS

FIG. 2 is a schematic, cross-sectional view taken generally in a plane along the line 2—2 in FIG. 1, for illustrating the generally symmetrical, relative positions of excore detectors about the reactor vessel;

FIGS. 5A and FIG. 5B are side elevational and top plan views of an alternative embodiment of an integral, insulator and support for use in the excore power range detector assembly of the present invention and as otherwise shown in FIGS. 1 and 3.

DETAILED DESCRIPTION OF THE PREFERRED EMBODIMENT

Figure 1:
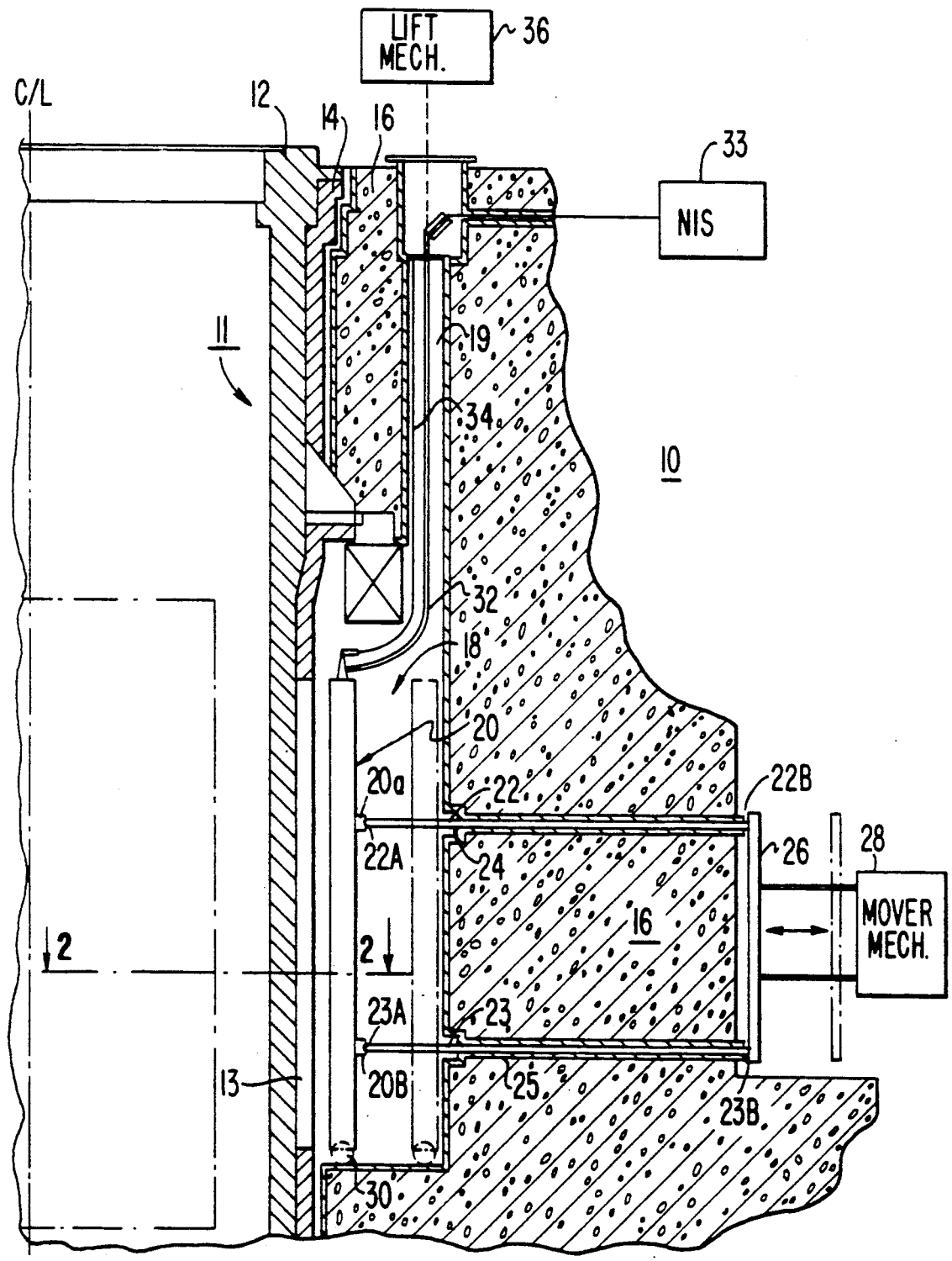
FIG. 1 is a fragmentary and schematic elevational view, partly in cross-section, of the improved excore neutron flux detector of the invention, as positioned by positioning and support mechanisms within a corresponding thimble, or well, of an illustrative containment structure of an associated nuclear reactor vessel and including a nuclear instrumentation system for processing the outputs of the excore detector.

FIG. 1 illustrates, in simplified and schematic form, a nuclear reactor plant 10, of which there is shown, in partial cross-section, the sidewall of a reactor vessel 11 having an outer shield 14 thereabout and positioned within a containment structure 16. The containment structure affords a well, or thimble, 18 which receives therein an excore power rang detector assembly 20 in accordance with the present invention (and shown in more detail in subsequent figures). It should be understood that the plant 10 of FIG. 1 is merely illustrative and is in no way limiting as to the configurations of nuclear reactor vessels and associated containment structures with which the improved excore detector assembly 20 of the present invention may be employed. For reasons which will become more significant hereafter, however, a specific such installation is illustrated to demonstrate, e.g., the restrictions on structural modifications of excore detectors as are imposed by an existing vessel and related containment and associated well or thimble structural configurations.

In the illustrative plant 10 of FIG. 1, the excore power level neutron flux detector assembly 20 is supported vertically and adjusted laterally within the well 18 by a pair of extension rods 22 and 23, which pass through corresponding laterally extending passageways 24 and 25 in the containment structure 16. The rods 22 and 23 are connected at their interior ends 22A and 23A to respective flanges 20*a* and 20*b* affixed to the excore detector 20; the exterior ends 22B and 23B thereof are connected to a mover bar assembly 26 attached to a mover mechanism 28 for moving the detector radially, relatively to the center line of the reactor vessel, within the well 18, inwardly to an operational position (solid line) proximate to the vessel wall 12 and outwardly to an inoperative position (dotted line) displaced, or remote, from the vessel wall 12. Typically, a cart-like arrangement illustrated by a wheel 30, provides laterally moveable, vertical support of the detector 20 within the well 18.

Electrical cables 32 extend from the detector 20, upwardly through a vertical channel 19 in the containment structure 19 which communicates with the well 18, to an external nuclear instrumentation systems ("NIS") 33, which responds to the detected signal outputs and produces suitable power level indications, alarms, and the like, as above discussed. Further, support cables 34 extend from the detector 20 to a lift mechanism 36 which functions, when the detector 20 has been moved to the inoperative (dotted line) position, to enable withdrawal of the detector assembly 20 through the vertical channel 19, thereby permitting maintenance, checking, and replacement of the active elements of the detector assembly 20.

FIG. 2 is a schematic, cross-sectional plan view of the vessel 11, taken in a plane along the line 2—2 in FIG. 2 and transverse to the central axis or central line ("C/L") of the vessel 11, for illustrating the general disposition of excore detectors about the exterior of the reactor vessel 11. Illustratively, four power level excore neutron detectors 20A, 20B, 20C, and 20D are disposed at 90 degree relatively displaced angular increments, symmetrically about the central line of the vessel 11 in corresponding thimbles or wells (not shown in FIG. 2, but see well 18 in FIG. 1). The wall 12 of the vessel 11 as well is illustrated in crosssectional, fragmentary form, with the associated outer shield 14 similarly so illustrated. Radially aligned with the excore power level detectors 20A–20D are respectively corresponding slots 13A–13D for enhancing the neutron flux leakage from the interior of the vessel 11 and into the vicinity of the respectively corresponding detectors.

As before noted, additional detectors typically are associated with a given vessel to provide monitoring of start-up and shut-down conditions and to provide more linear sensing of intermediate range conditions. Merely for completeness, further such detectors 21A and 21B with associated sensor slots 15A and 15B are illustrated, along with another typical provision of spare wells 21C and 21D and corresponding sensor slots 15C and 15D. While schematic in form, FIG. 2 illustrates the important need for symmetrical disposition of the detectors about the vessel 11, to assure that a representative cross section of the power level of activity within the vessel 11 is monitored. The power level detectors with which the present invention are concerned are defined, as to configuration and size including axial length, so as to monitor the level of activity substantially at all elevations within the core (not shown) of the vessel 11 and t thus are of substantial axial length, for example ten feet or more in axial length. Typically, in the operative (solid line) position shown in FIG. 1 and corresponding to the schematic positions 20A–20D of FIG. 2, the detectors are disposed approximately one foot from the respectively corresponding slots 13A–13D and are laterally/radially transportable to the inoperative (dotted line) position shown in FIG. 1 (not shown in FIG. 2) over a distance of a few feet (e.g., two feet or more).

As before noted, the architecture, or design, of pressure vessels and their associated containment structures vary widely. Thus, the radially adjustable mounting of the detector 20 in FIG. 1 is an optional, or customized feature; in other vessels, the thimble may provide only a single, fixed radial position for its associated detector. This may be envisioned by the modification of the structure of FIG. 1 such that the well, or thimble, 18 is substantially of the same diameter as and axially aligned with the vertical channel 19, and with the result that no radial adjustment of the detector 20 is permitted. In that instance, of course, the radial displacement between the well or thimble 18 relatively to the wall of the vessel 11 corresponds to a permanent operative position of the detector 20. The exact radial displacement, of course, is a matter of initial design considerations. Nevertheless, in either the instance of the moveable detector 20 as shown in FIG. 1 or the fixed well position detector of such an alternative architecture, as just described, it will be apparent that the well configuration imposes significant constraints on any structural modification of the detector 20 which might be considered for purposes of enhancing neutron sensitivity and thereby to compensate for decreased neutron flux leakage.

It is also pertinent to note that alternative detectors, such as are employed for detecting intermediate range and/or start-up and shut-down conditions are of different sizes and configurations and are placed strategically relatively to the vessel 11 to maximize sensitivity to the neutron flux leakage during these rather differing operating conditions. Those different operating conditions as well contribute to different designs of these alternative types of detectors, and correspondingly the same are not relevant to the power level excore neutron flux detector assemblies of the present invention.

Figure 3:
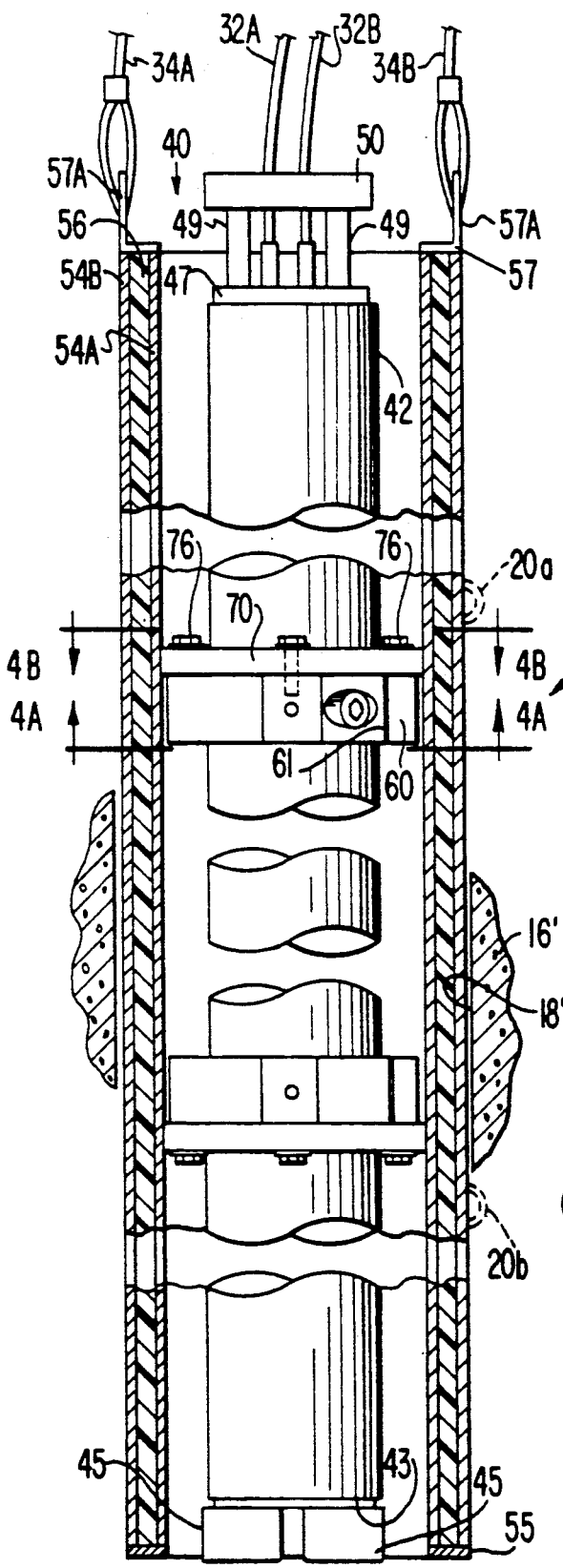
FIG. 3 is a schematic {broken-away/crosssection?} elevational view of an excore power range detector assembly in accordance with the present invention, used in the illustrative reactor vessel installation of FIG. 1.

The power level, excore neutron flux detector assembly 20 of the present invention is shown in a partly broken away and partly schematic, elevational cross-sectional view in FIG. 3. A detector subassembly 40, which may be a conventional power level excore detector, has the configuration of a generally elongated and cylindrical sleeve 42 within which the detector components are housed and having a closed lower end 43 which rests upon and is secured to ceramic insulating bushings 45. Although not shown in FIG. 3, the bushings 45 may rest upon a cart-like arrangement secured to wheel 30, as schematically shown in FIG. 1 in the case of an installation which permits lateral/radial movement of the detector assembly 20; in an alternative installation in which the detector assembly 20 is not so moveable, as above described, the bushings 45 may rest directly on the bottom wall of the associated well 18. A cap 47 encloses the opposite, upper end of the enclosure 42 and may have affixed thereto studs 49 in turn affixed to a support plate 50. Electrical cables 32A and 32B, corresponding to the cables 32 of FIG. 1, extend through the top plate 50 and end cap 47 for electrical connection to the sensor components disposed within the housing 42. The separate cables 32A and 32B are illustrated to indicate the provision of two (or more) axially related upper and lower detectors within the enclosure 42.

A moderator subassembly 52, which may be of generally cylindrical configuration, is disposed coaxially about the detector subassembly 40 and preferably is of somewhat greater axial length than the cylindrical enclosure 42. The moderator subassembly 52 more specifically comprises a dual wall canister 54 comprising concentric, radially spaced and generally cylindrical inner and outer walls 54A and 54B, the annular space therebetween being filled by moderator material 56. Lower and upper annular-configured end caps 55 and 56 are affixed in water-type relationship to the inner and outer walls 54A and 54B. The upper end cap 56 further includes brackets 57A to which lift cables 34A and 34B are affixed, corresponding to the lift cable 34 of FIG. 1. A pair of brackets 20a and 20b, corresponding to those of FIG. 1 (but optional, and thus shown in phantom lines) extend radially from axially aligned positions on the outer wall 54B, for supporting the detector assembly 20 in the manner illustrated in FIG. 1. FIG. 3 on the other hand also illustrates the alternative well configuration discussed above as a modification of FIG. 1, and particularly wherein the containment 16' defines a well 18', both shown only in fragmentary section in FIG. 3, having a interior diameter only slightly larger than the exterior diameter of the canister 54. Significantly, the moderator subassembly 52 thus is readily adaptable for use in either of the alternative well configurations/sizes discussed in connection with the illustrative nuclear power plant 10 of FIG. 1.

The detector assembly 20 of the invention overcomes the problem of inadequate sensitivity of the existing power level neutron flux excore detectors through the provision of the moderator material 56 of the moderator subassembly 52, disposed in surrounding relationship with the neutron flux detector subassembly 40, which may itself be of conventional type, as above-noted. The moderator material 56 serves to convert epithermal neutrons, which leak from the reactor and impinge thereon, to thermal neutrons (0.0253eV) which conventional power level detectors, such as the detector subassembly 40, are designed to detect.

More particularly, such conventional detectors are not capable of detecting epithermal neutrons. Hence, conventional power level neutron excore detectors rely on the absorption of epithermal neutrons contained in the leakage neutron flux by the surrounding containment material, and conversion and re-emission thereof as thermal neutrons, for producing neutron fluency at an energy level to which the (conventional) power level neutron detector subassembly 40 can respond. This critical conversion function performed by the surrounding containment structure imposes a significant constraint on any structural modifications for improving sensitivity, where such modifications would result in altering the preexisting relative relationship and thus altering the detector response characteristics, e.g., such as by rendering same non-linear, etc. The present invention is in compliance with these and other constraints, above discussed, while fulfilling the critical requirement of increasing detector sensitivity. As will be apparent from FIG. 3, the moderator subassembly 52 satisfies these constraints as to maintaining structural compatibility and avoiding the introduction of non-linear response characteristics, due to the symmetrical character of the canister 54 relatively to the detector subassembly 40, as surrounded thereby and enclosed therewithin, and also by being structurally compatible and symmetrical relatively to the surrounding walls of the well 18' and related structures. In addition to the uniform, sensitivity-enhancement characteristics of the moderator subassembly 52, its compact configuration satisfies the constraint as to permissible structural reconfiguration of the detector, in that the over-all detector assembly 20 maintains compatibility with existing well configurations even for the limiting case of the restrictive dimensions of the well 18' illustrated in FIG. 3. Particularly, and while fortuitus, sufficient annular space exists in even the restrictive well 18' to accommodate the moderator subassembly 52, in view of the relatively minimal annular space envelope which it occupies.

As before noted, however, both electrical and seismic constraints must be satisfied, despite the presence of the moderator subassembly 52. The manner in which these constraints are satisfied by the present invention are now addressed, with concurrent reference to the cross-sectional views of FIGS. 4A and 4B in conjunction with FIG. 3. More particularly, FIG. 4A is a cross-sectional view, taken in a plane transverse to the axis of the detector assembly 20 along line 4A—4A in FIG. 3 and FIG. 4B is a corresponding such view along line 4B—4B in FIG. 3.

The split ring support 60 includes mating half-annular rings 60A and 60B defining an interior diameter corresponding substantially to the exterior diameter of the detector housing 42. The halfannular ring 60B has bores 62 therein for receiving corresponding bolts 63, the shafts thereof extending through the bores 64 and into threaded engagement in threaded bores 65 in the mating annular half ring 60A. One or more shims 61 may be provided between the facing ends of the rings 60A and 60B to afford firm clamping engagement of the cylindrical detector housing 42 but without unduly compressing or crushing same. The split ring support 60 as thus far described may be of conventional configuration, and in which case, typically, the outer circumference thereof includes flats 66A-D having corresponding threaded bores 67A-D therein for receiving in threaded engagement the ends of mounting bolts which pass through radially extended ceramic bushings (an illustrative such bushing 68A being shown in phantom lines in FIG. 4A). Four such bushings and associated mounting bolts for securing same to the split ring support 60, in conventional installations, serve to concentrically position and laterally support the detector subassembly 42 of conventional type within an associated well 18' as illustrated in FIG. 3 or within the well 18 of FIG. 1. In the case of the restricted well 18', the outer radius defined by the set of bushings (such as A) corresponds substantially to the interior diameter of the restricted cylindrical well 18', and serves to afford the requisite electrical insulation and physical spacing of the detector subassembly 40 from the side walls of the well 18'. The presence of bushings 68A, . . . , of course precludes the use of the moderator subassembly 52 with the conventional detector 40, in the case either of the constricted well 18' of FIG. 3 or of the larger well 18 of FIG. 1.

Figure 4B:
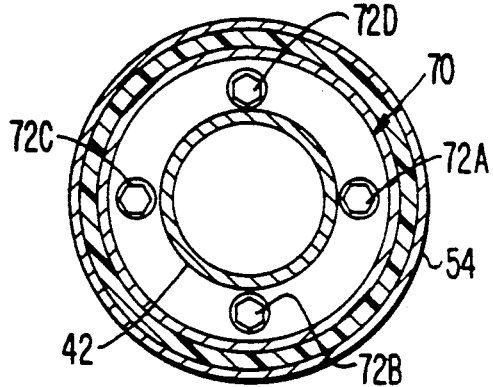
FIG. 4B is simplified cross-sectional view, taken in a plane transverse to the axis of the excore detector, along the line 4B—4B of FIG. 3.
Figure 4A:
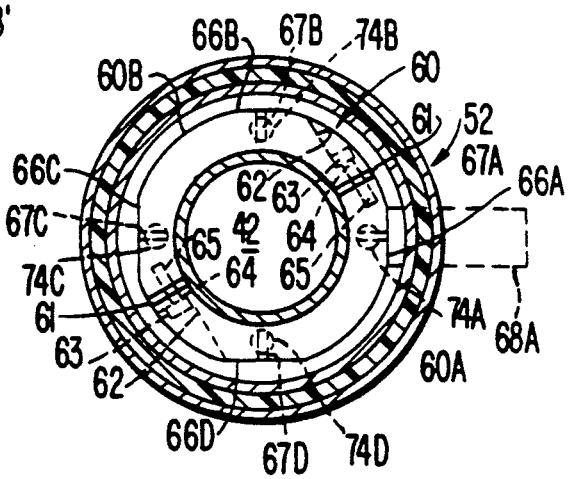
FIG. 4A is a simplified cross-sectional view, taken in a plane transverse to the axis of the excore detector, along the line 4A—4A of FIG. 3.

This problem was solved in accordance with the present invention through the provision of a spacer disk 70 formed of a ceramic, insulating material, shown in plan view in FIG. 4B. A series of spaced holes, or bores, 72A-72D, preferably equiangularly spaced at 90 degree intervals, extend in parallel axial relationship through the disk 70 and in alignment with mating, threaded holes 74A-74D formed in the ring support 60, and through which corresponding bolts 76 (FIG. 3) are received to secure the ceramic spacer disk 70 to the support disk 60. The outer diameter of the insulating spacer disk 70 is substantially the same as, and specifically slightly smaller than, the inner diameter of the moderator subassembly 52, so as to permit relative axial (telescoping) movement of the detector subassembly 40 and the moderator subassembly 52.

The ceramic spacing disk 70 along with the requisite modification of disk 60 for securing same together have been determined to afford adequate electrical insulation of the detector subassembly 40 from the moderator subassembly 52 while affording the requisite structural positioning of same in aligned relationship, despite the minimal annular space envelope available within the conventional, restricted well 18'.

Illustrative of the dimensional relationships, the interior diameter of the well or thimble 18' typically may be 7 inches, whereas the outer diameter of the sleeve 42 of the conventional detector subassembly 40 typically may be 3 inches and that of the conventional split support ring 60 typically may be about $4\frac{1}{2}$ inches; the annular space envelope of approximately $1\frac{1}{4}$ inches (radial) in the conventional installation is sufficient to accommodate the bushings (such as 68A in FIG. 4A) which provide the requisite centering and electrical insulating functions. That space envelope, however, is of minimal extent and imposes a severe constraint as to possible structural modifications for enhancing sensitivity of the conventional detector subassembly 40.

It was determined, however, despite the minimal annular space envelope available, that the requisite increased sensitivity could be achieved through the provision of the thin, dual-walled canister 54 containing moderator material 56 therein. Particularly, the inner and outer side walls 54A and 54B, respectively, may be formed of sheet metal of approximately 1/8 inch thickness, defining an interior diameter of the inner wall 54A of approximately $4\frac{3}{4}$ inches and an exterior diameter of the outer wall 54B of approximately $6\frac{3}{4}$ inches. The radial dimension of the annular space therebetween, and within which the moderator material 56 is received, thus may be approximately $\frac{1}{2}$ inch to $\frac{3}{4}$ of an inch, or a nominal $\frac{5}{8}$ inch space, measured radially.

Careful selection of the material of the side walls 54A and 54B and of the moderator material 56 is essential to achieving the required increased sensitivity, while also satisfying the other, abovenoted constraints. A preferred side-wall material is high grade aluminum, such as is commercially available and known as 1100 grade aluminum (approximately 99 percent pure aluminum). Such high grade aluminum is particularly desirable due to its high resistance to radiation contamination. Where operating conditions impose somewhat lesser concerns as to contamination, commercial 3003 grade aluminum (containing approximately 1.2 percent manganese, but the remainder otherwise substantially pure aluminum) may be employed in the alternative. Operating environments, on the other hand, may impose other, higher priority concerns; thus, for example, where protection against a loss of coolant accident ("""LOCA") dictates that increased structural integrity must be given a greater priority than minimizing radiation contamination, high quality stainless steel may be employed in the alternative.

The moderator material 56, in a presently preferred embodiment, comprises a high density polyethylene moderator material commercially known as "HDPE". Preferably, it is extruded into a hollow tube of annular cross-section having a (radial) wall width corresponding to and slightly smaller than the annular space between the inner and outer side walls 54A and 54B, whereby it is adapted to be slid therebetween in assembling the moderator subassembly 52. The provision of end caps 55 and 56 is important in this regard, in that they serve to confine the HDPE material 56 within the canister 54, even in the case of a LOCA (loss of coolant accident) or seismic and other disturbances, which could result in discharge of the moderator from within the canister 54.

FIGS. 5A and 5B are side elevational and plan views, respectively, of an alternative, integrated ceramic insulator support and spacing element 80, which integrates the respective, separate structures and functions of the support and spacing elements 60 and 70 of the preceding embodiment. The element 80 again is of a split ring configuration, comprising mating half-rings 80A and 80B having respective, mating flanges 82A, 82B, and 83A, 83B extending radially from opposite ends thereof and arranged in paired sets, with aligned bores for receiving there-through corresponding bolts 84 and associated securing nuts 85 with (optional) spacing shims 86 therebetween, as required, to securely clamp the detector canister 42 (FIG. 3) within the central opening 87 thereby defined, without unduly compressing same. The integrated element 80 thus may be employed in the alternative to the combined clamp and support rings 60 and 70 of FIG. 3 and, since a single element, greatly facilitates and simplifies assembly procedures for converting a conventional detector to the improved detector and moderator assembly of the present invention.

Figure 6C:
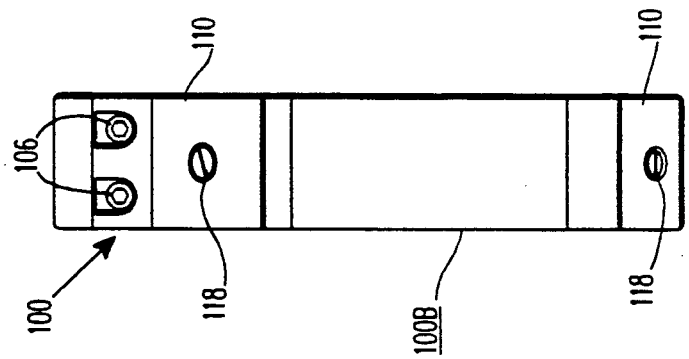
FIGS. 6A, 6B and 6C are plan, vertical elevational and side elevational views of yet a further alternative embodiment of an integral insulator and support for use in the excore power range detector assembly of the present invention and as otherwise shown in FIGS. 1 and 3.
Figure 6B:
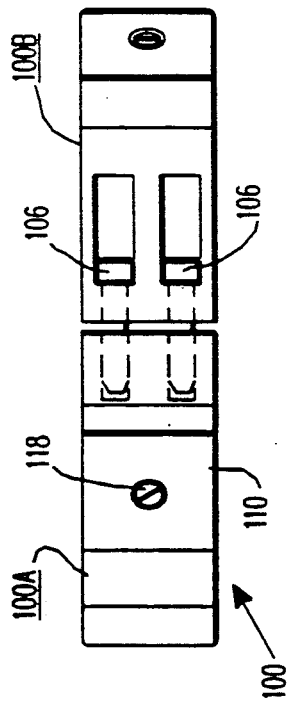
Figure 6A:
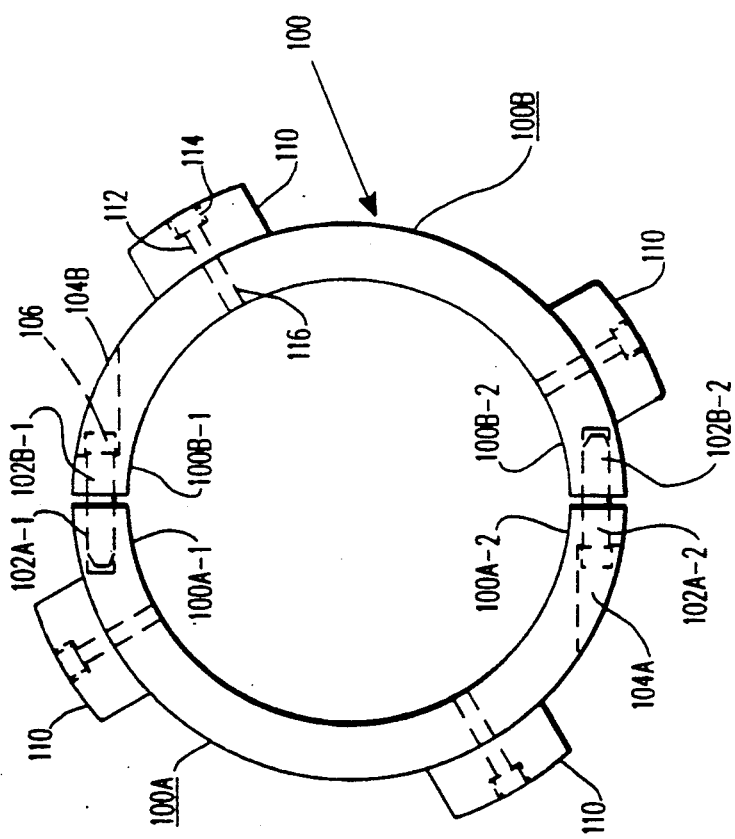

FIGS. 6A, 6B and 6C are side elevational, top plan and side elevational views of yet a further alternative embodiment of an integrated ceramic insulator support and spacing element 100, corresponding to the element 80 of FIGS. 5A and 5B but offering yet further important advantages. More particularly, the element 100 again is of a split ring configuration, comprising mating half-ring 100A and 100B as best seen in FIG. 6A, having respective mating and opposed ends 100A-1, 100B-1, 100A-2, 100B-2. The opposed ends 100A-1, 100B-1 and 100A-2, 100B-2, further have respective, aligned bores 102A-1, 102B-1 and 102A-2, 102B-2. Respective, aligned counterbores 104A and 104B are provided in conventional fashion to accommodate the head of a bolt to be received in the respective, aligned bores, it being understood that the bores 102A-1 and 102B-2 are internally threaded. As best seen FIGS. 6B and 6C, two such sets of aligned bores with corresponding counterbores are provided at the respective, opposed ends of the split rings 100A and 100B for receiving corresponding screws 106, preferably of socket head type, which serve to secure the assembled element 100 on the surface of the detector canister 42, the latter as shown in FIG. 3 and in FIG. 5A.

By comparison to the element 80 of FIGS. 5A and 5B, the outer diameter of the assembled ring element 100 is reduced so as to define a cylindrical, circumferential surface 106. plurality of ceramic insulators 110 are positioned about the surface 106 at relative 90° displacements and preferably displaced (i.e., in a rotational sense) relatively to the ends 100A-2 and 100B-1 and the respective counterbores 104A and 104B, thereby to facilitate access to the socket heads of the screws 106 during assembly. As shown illustratively and in phantom lines in FIG. 6A, for the spacer 110 positioned adjacent the end 100B-1, a through-bore 112 and aligned counterbore 114 are formed therein, in alignment with a threaded bore 116 extending radially through the half-ring 100B and within which pan head screws 118 (FIG. 6B and 6C) are received to mechanically secure each such insulator spacer 110 onto the corresponding split-ring 100B (or 100A).

The outer surfaces 120 of the spacer elements 110 define respective arcuate segments, preferably symmetrically disposed at equiangular displacements (90° for the illustrated embodiment), each of which together with its diametrically opposed element 110 defining a diametral distance, or spacing, corresponding to the interior diameter of the dual wall canister of the modulator subassembly 52, as seen in FIG. 3 and when in assembled relationship therewith. The element 100 thus affords segmented, annular open spaces extending circumferentially between the adjacent, angularly displaced spacer elements 110 and radially between the exterior annular surface 106 of the element 100 and the interior cylindrical surface of the moderator subassembly 52 (i.e., the interior wall 54A thereof). These spacers greatly facilitate axial fluid flow through the interior of the moderator subassembly 52 and in surrounding relationship about the outer circumferential surface of the detector subassembly 40.

Experimentation with the detector assembly of the invention revealed that the provision of adequate flow paths is of particular importance in installations in which the environmental conditions introduce the potential of boric acid crystallization on the exposed surfaces of the detector assembly over which the fluid flows. Such crystallization can accumulate and ultimately span the radial gap between the detector and moderator subassemblies, adversely affecting the required electrical isolation therebetween. The improved fluid flow afforded by the element 100 serves to minimize this potentially adverse crystallization condition from developing and thus to maintain the required physical spacing and electrical isolation.

In the assembly of the element 100, preferably an epoxy resin is introduced at the interface of the spacer elements 100 and the corresponding portions of the surface 106 so as to secure same in place with the respective axial bores in alignment, both facilitating assembly and supplementing and enhancing the strength of the interconnection therebetween.

In accordance with a further feature of the present invention, at least the exposed surfaces of the respective aluminum sidewalls of the detector and moderator subassemblies are anodized. Anodization is a known technique for protecting aluminum surfaces from the caustic fluids inherent in a nuclear reactor environment. However, in accordance with the present invention, anodization has been surprisingly discovered also to afford improved electrical isolation at the outset and, along with the caustic fluid protection and reduction of crystallization, above-noted, collectively serve both to improve the operating characteristics and to extend the operating life of the device.

In both the embodiments of the integrated element 80 and 100 and in the embodiment of FIGS. 4A and 4B comprising the combined support and spacer disk elements 60 and 70 of the invention, the requisite structural support and electrical insulation relative to and between the detector subassembly 40 and the moderator subassembly 52 are achieved, while satisfying constraints as to minimal structural alteration and avoidance of the introduction of non-linearities and/or other adverse effects on the response characteristics of the detector and yet affording the requisite increased sensitivity. Anodization of the exposed aluminum surfaces further has been discovered to afford both enhanced electrical isolation as well as to protect against crystallization on the exposed surfaces thereby affording both increased electrical isolation and increased life of the detector assembly of the invention. Necessarily, recalibration of the nuclear instrumentation system (33) must be preformed, to take into account the increased level of the detection output signals of the detector, a function which is readily performed by known techniques. The significant factor, however, is that the linear enhancement or increase of the detection signal level is achieved without alteration of structural configurations in a manner which would introduce non-linearities and thus adversely affect response characteristics.

Numerous modifications and adaptations of the improved detector assembly of the present invention will be apparent to those who are skilled in the art and thus it is intended by the appended claims to encompass all such adaptations and modifications which fall within the true spirit and scope of the invention as claimed herein.

We claim as our invention:

1. An excore neutron flux power level detector assembly, receivable in an existing, vertical detector thimble of a containment structure housing a nuclear reactor, for monitoring the power level of the reactor during normal operating conditions by detecting the level of neutron flux leakage, containing both thermal and epithermal neutrons, from the nuclear reactor and having increased detection sensitivity, relative to a given level of thermal neutron flux leakage, the detection thimble having specified and substantially non-alterable interior vertical length and lateral cross-sectional dimensions, comprising:

a neutron flux detector subassembly comprising a generally elongated and cylindrical housing of a first axial length and a first exterior diameter and corresponding first length and first lateral cross-sectional dimensions respectively less than those interior dimensions of the thimble so as to be received in the thimble and to define at least a minimum annular space, surrounding and separating the housing from the interior of the thimble when received therein and affording a required level of electrical isolation therebetween and having upper and lower closed ends and at least one neutron flux detector received within the housing and extending for at least a portion of the first axial length of the housing, the neutron flux detector selectively detecting the level of thermal neutrons contained in the neutron flux leakage;

a moderator subassembly comprising a dual-wall canister having inner and outer generally cylindrical walls of respective, second interior and exterior diameters defining an annular cross-section less than the minimum annular space surrounding the housing and maintaining the electrical isolation between the housing and the thimble, and of a common, second axial length and with respective upper and lower ends and defining an annular space therebetween, the moderator subassembly having interior diameter greater than the exterior diameter of the cylindrical housing of the neutron flux detector subassembly and defining a cylindrical, interior chamber for receiving the neutron flux detector subassembly in telescoping relationship therein and a second, exterior diameter, the common axial length of the subassembly walls being sufficient to encompass each neutron flux detector received within the housing and less than the vertical height of the thimble, moderator material disposed in and filling the annular space between the inner and outer generally cylindrical walls, the moderator material converting epithermal neutrons contained in the neutron flux leakage and impinging thereon to thermal neutrons which are emitted therefrom and impinge on and thereby are detected by the neutron flux detector subassembly, and upper and lower annular end caps affixed to the respective, upper and lower ends of the inner and outer cylindrical walls and extending across the annular space therebetween for sealing the moderator material within the annular space; and means for concentrically positioning and laterally supporting the detector subassembly within, and laterally spaced and electrically insulated from, the moderator subassembly and thereby maintaining the specified level of electrical isolation.

2. A detector assembly as recited in claim 1, wherein the common, second axial length of the sidewalls of the moderator subassembly is of substantially the same predetermined axial length as the detector subassembly.

3. A detector assembly as recited in claim 1, wherein the common, second axial length of the sidewalls of the moderator subassembly is at least as great as the same first axial length of the detector subassembly.

4. A detector assembly as recited in claim 1, wherein said positioning and supporting means comprises:
   a supporting ring extending about and coaxial with and affixed in clamping relationship on the cylindrical housing of the detector subassembly and having an outer diameter less than the inner diameter of the inner cylindrical wall of the moderator subassembly; and
   a spacer disk of electrically insulating material and having an annular configuration including an inner cylindrical opening for receiving therein the cylindrical housing of the detector and an outer diameter greater than the outer diameter of the support ring and substantially equal to, but sufficiently less than, the inner diameter of the inner wall of the canister of the moderator subassembly to permit relative, telescoping movement therebetween, the disk being affixed the support ring.

5. A detector assembly as recited in claim 4 wherein the support ring comprises:
   first and second mating, half-rings with respective, mating planar end surfaces parallel to a plane common to the axis of the cylindrical housing;
   plural bores extending transversely through the mating end surfaces of the first half-ring and respective, aligned and threaded bores extending transversely through the mating end surfaces of the second half-ring; and
   plural bolts received through the corresponding bores in the first half-ring and threadingly engaged in the respective, aligned and threaded bores of the second half-ring, the bolts securely clamping the first and second half-rings together the cylindrical housing therebetween.

6. A detector assembly as recited in claim 5, wherein:
   the support ring further includes a plurality of parallel-axial and angularly displaced threaded bores therein;
   the spacer disk further includes a corresponding plurality of parallel-axial and angularly displaced bores therethrough, respectively aligned with the parallel-axial bores of the ring; and
   a corresponding plurality of bolts are received through the respective bores of the spacer disk and threadingly engaged in the respective, aligned and threaded, parallel-axial bores of the support ring and thereby secure the spacer disk to the support ring.

7. A detector assembly as recited in claim 4, wherein the positioning and supporting means comprises first and second, respectively associated support rings and spacer disks affixed in clamping relationship on the cylindrical housing of the detector subassembly at axially displaced positions along the length thereof.

8. A detector assembly as recited in claim 1, wherein the positioning and supporting means comprises:
   an integrated, ceramic insulator support and spacing element, of split ring and generally annular configuration concentrically mounted on the cylindrical housing of the detector and comprising first and second half-rings with mating, planar end faces parallel to a plane common to the axis of the cylindrical housing, each end face including a pair of flanges extending therefrom in respective and opposite parallel-axial directions, the corresponding flanges of the first and second half-rings having a plurality of aligned bores extending therethrough in a direction transverse both to the respective, mating and planar end faces and to the axis of the cylindrical housing of the detector; and
   a corresponding plurality of bolts received through the plurality of aligned bores in the corresponding, mating flanges of the first and second half-rings and nuts received on the free ends of the bolts for securing the half-rings together and in clamping relationship on the exterior cylindrical surface of the detector housing.

9. A detector as recited in claim 1, wherein the dual-wall canister is formed of substantially pure aluminum.

10. A detector as recited in claim 1, wherein the dual-wall canister is formed of stainless steel.

11. A detector as recited in claim 1, wherein the moderator material comprises high density polyethylene.

12. A detector assembly as recited in claim 1, wherein at least exposed surfaces of the housing of the neutron flux detector subassembly and of the dual-wall canister of the moderator subassembly are anodized.

13. A detector assembly as recited in claim 1, wherein said positioning and supporting means comprises:
   first and second mating, half-rings, each having opposite ends of mating configuration with respect to the corresponding opposite ends of the other half-ring and disposed in spaced relationship when the half-rings are assembled as a ring in surrounding relationship on the cylindrical detector housing;
   means for interconnecting the mating, opposite ends thereby to secure the half-rings together as a ring assembly and in clamping relationship on the cylindrical housing of the detector, the outer circumferential diameter of the ring assembly being less than the second, interior diameter of the dual wall canister of the moderator subassembly and thereby defining an annular gap therebetween; and, insulator spacers, each of a limited arcuate segment and angularly displaced about the circumferential surface of the ring assembly and substantially, radially spanning the annular gap, for concentrically positioning and laterally supporting the detector subassembly within, and laterally spaced and electrically insulated from, the moderator subassembly, the insulator spacers defining annular gap segments affording corresponding fluid flow paths between the interior surface of the inner wall of the modulator subassembly and the outer surface of the assembled support rings.

14. A detector assembly as recited in claim 13, wherein said interconnecting means comprises aligned bores extending in a direction transverse to the axes of the coaxial detector and moderator subassemblies and through the respective, opposite and mating ends of the first and second half-rings and corresponding screws received through the aligned bores and interconnecting the corresponding mating ends.

15. A detector assembly as recited in claim 13, wherein the insulator spacers are secured to the respective half-rings by screws, which extend through corresponding radial bores in the insulator spacers and are received in threaded engagement in aligned, threaded bores in the respective half-rings.

16. A detector assembly as recited in claim 13, wherein the spacer elements are secured to the surface of the respective spacer half-rings by epoxy.

* * * * *